(12) United States Patent  
Matsuzono et al.

(10) Patent No.: US 7,767,164 B2
(45) Date of Patent: Aug. 3, 2010

(54) CATALYTIC CONVERTER APPARATUS FOR PURIFYING EXHAUST GAS

(75) Inventors: Yoshiaki Matsuzono, Saitama (JP); Hirosuke Ohkubo, Saitama (JP); Takashi Iwamoto, Saitama (JP); Takeshi Narishige, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 11/725,544

(22) Filed: Mar. 20, 2007

(65) Prior Publication Data

US 2007/0227130 A1    Oct. 4, 2007

(30) Foreign Application Priority Data

Apr. 3, 2006    (JP) .............................. 2006-102549

(51) Int. Cl.
*B01D 50/00*    (2006.01)
(52) U.S. Cl. ...................................... 422/180; 422/177
(58) Field of Classification Search ................. 422/168, 422/180, 211; 60/299; 502/302, 327, 328
See application file for complete search history.

(56) References Cited

U.S. PATENT DOCUMENTS 5,753,580 A * 5/1998 Hayashi et al. ............. 502/304
5,881,553 A * 3/1999 Steenackers et al. .......... 60/299
2003/0162650 A1  8/2003 Marques et al.

FOREIGN PATENT DOCUMENTS

| EP | 1364708 A | 11/2003 |
|---|---|---|
| JP | 02-194842 | 8/1990 |
| JP | 10-205325 | 8/1998 |
| JP | 2001-115893 | 4/2001 |
| JP | 2004-000838 | 1/2004 |
| JP | 2004-330025 | 11/2004 |
| JP | 2004-330025 A | 11/2004 |

* cited by examiner

*Primary Examiner*—Tom Duong
(74) *Attorney, Agent, or Firm*—Arent Fox LLP

(57) ABSTRACT

The present invention relates to a catalytic converter apparatus for purifying exhaust gas from an internal combustion engine for vehicles. The catalytic converter apparatus includes a first catalytic converter that holds a first catalyst and that is to be coupled to a side of the engine, and a second catalytic converter that holds a second catalyst and that is coupled to a rear of the first catalytic converter. Each of the first and second catalysts has a catalytic support on which a wash coat layer having a thickness equal to or less than 0.2 mm is formed. The wash coat layer includes a first wash coat layer and a second wash coat layer, and each of the first and second wash coat layers has voids therein. This catalytic converter apparatus achieves an improved purification property with a small number of cells and a small amount of noble metal.

2 Claims, 8 Drawing Sheets

TEST VEHICLE Y

EXHAUST STRUCTURE: G TYPE

TEST VEHICLE Z

EXHAUST STRUCTURE: H TYPE

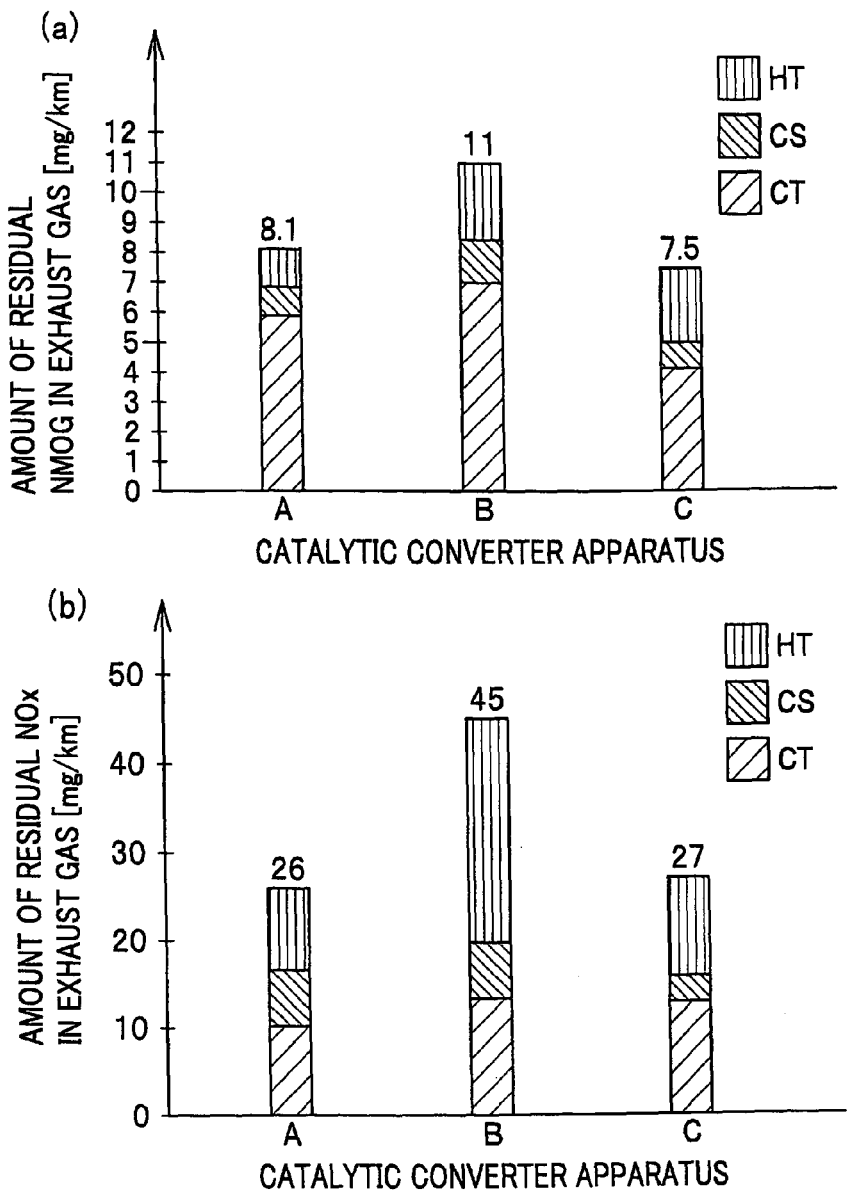

FIG.5

TEST RESULT OF G TYPE OF EXHAUST STRUCTURE

TEST CONDITIONS

| CATALYTIC CONVERTER APPARATUS | CATALYST IN FIRST AND SECOND CATALYTIC CONVERTERS | | | | REMARK |
|---|---|---|---|---|---|
| | THE NUMBER OF CELLS | | AMOUNT OF NOBLE METAL (g/car) | WASH COAT LAYER | |
| | FIRST CATALYTIC CONVERTER | SECOND CATALYTIC CONVERTER | | | |
| A | 900 | 600 | 12 | THICK, NO VOIDS | COMPARATIVE EXAMPLE 1 |
| B | 900 | 600 | 4 | THICK, NO VOIDS | COMPARATIVE EXAMPLE 2 |
| C | 400 | 350 | 4 | THIN, VOIDS | EXAMPLE |

FIG. 6

TEST RESULT OF H TYPE OF EXHAUST STRUCTURE

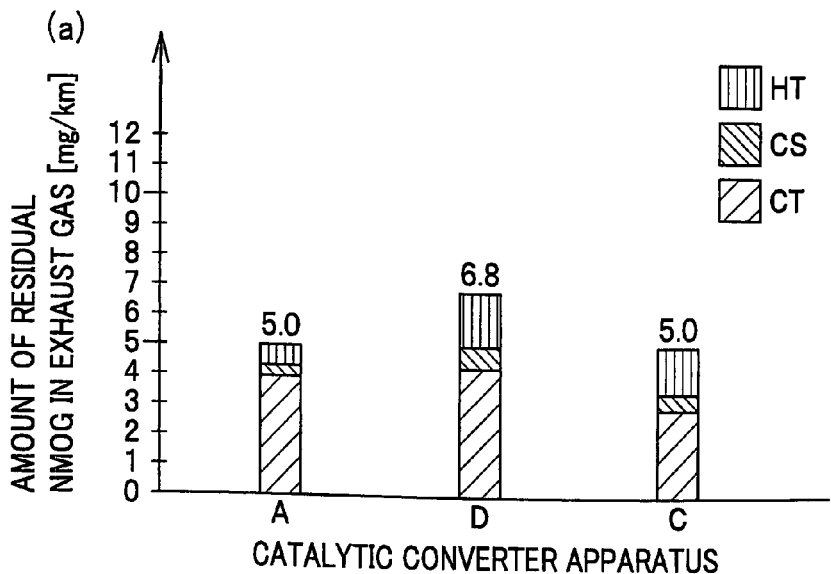

(a)

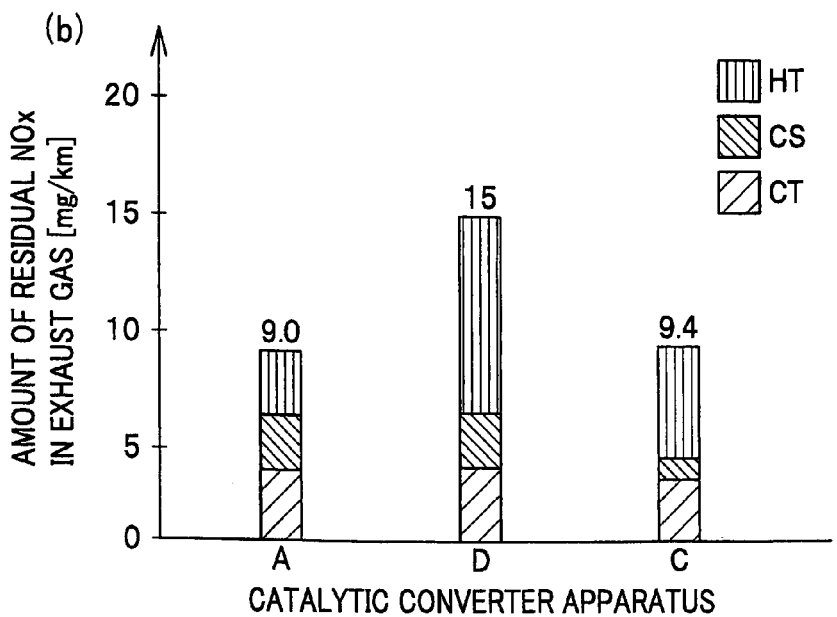

(b)

TEST CONDITIONS

| CATALYTIC CONVERTER APPARATUS | CATALYST IN FIRST AND SECOND CATALYTIC CONVERTERS | | | | REMARK |
|---|---|---|---|---|---|
| | THE NUMBER OF CELLS | | AMOUNT OF NOBLE METAL (g/car) | WASH COAT LAYER | |
| | FIRST CATALYTIC CONVERTER | SECOND CATALYTIC CONVERTER | | | |
| A | 900 | 600 | 12 | THICK, NO VOIDS | COMPARATIVE EXAMPLE 1 |
| D | 400 | 350 | 12 | THICK, NO VOIDS | COMPARATIVE EXAMPLE 3 |
| C | 400 | 350 | 4 | THIN, VOIDS | EXAMPLE |

COMMERCIAL VEHICLE X

FIG.8A
FIG.8B
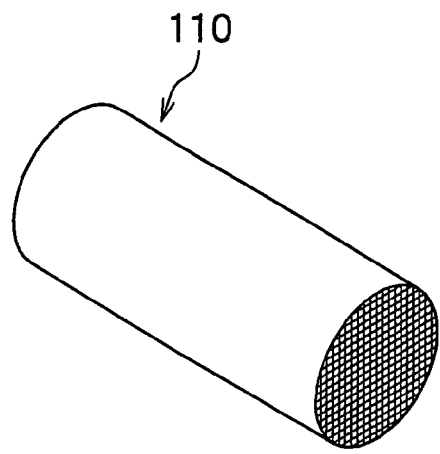
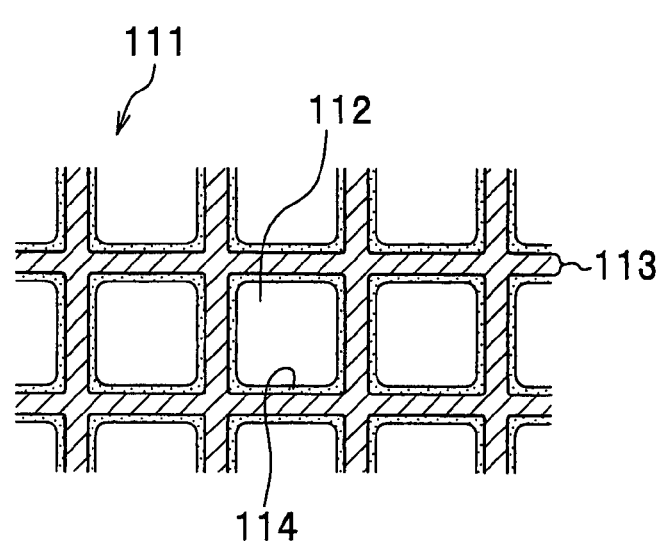

CATALYTIC CONVERTER APPARATUS FOR PURIFYING EXHAUST GAS

CROSS-REFERENCE TO RELATED APPLICATIONS

This application claims the benefit of Japanese Patent Application 2006-102549 filed on Apr. 3, 2006, the disclosure of which is incorporated herein by reference.

BACKGROUND OF THE INVENTION

1. Field of the Invention

The present invention relates to a catalytic converter apparatus for purifying exhaust gas from an internal combustion engine (hereinafter, called an "engine") for vehicles. More specifically, the present invention relates to a catalytic converter apparatus which purifies exhaust gas from an engine with a small amount of noble metal, and which is configured to decrease the exhaust gas pressure of the engine.

2. Description of the Related Art

With reference to FIG. 7, a description will be given below, of a process for purifying exhaust gas from an engine 10a of a commercial vehicle X.

First, the engine 100a discharges exhaust gas through cylinders within a cylinder block 101. Subsequently, the exhaust gas flows through an engine head block 102 and an exhaust manifold 103 where multiple exhaust pipes are joined together. Finally, the exhaust gas reaches a catalytic converter 109, and it is purified there.

The catalytic converter 109 holds catalysts 106b and 107b. Referring to FIGS. 8A and 8B, an exhaust gas catalyst 110 has a honeycomb structure 111 made of ceramic or metal which includes a catalyst support 113 and a wash coat layer 114. In addition, the wash coat layer 114 supports noble metal, such as platinum (Pt), palladium (Pd) or rhodium (Rh), that serves as a catalyst. Specifically, the exhaust gas catalyst 110 is formed by coating and baking the wash coat layer 114 on the honeycomb structure 111. The catalyst support 113 and the wash coat layer 114 define multiple cells 112. When exhaust gas passes through the cells 112, non methane organic gas (NMOG) and NOx, etc. contained in the exhaust gas is removed.

On the other hand, for the purpose of reducing environmental pollution, regulations against harmful substances such as NMOG and NOx are becoming stringent year by year. To give one example, Partial Zero Emission Vehicle (PZEV), which has been introduced by California, the U.S.A., is currently one of the strictest regulations for commercial vehicles. Only a handful of vehicles observe this regulation at present. Accordingly, catalytic converter apparatuses which exhibit an enhanced property of purifying exhaust gas have been in demand.

In order to comply with such strict regulations against harmful substances, various attempts to improve the purification property of catalytic converter apparatuses have been made. Some examples of those attempts are as follows:

1) to enlarge an area where exhaust gas comes into contact with the wash coat layer 114 (of FIG. 8B);

2) to grow the number of cells 112 in the honeycomb structure 111, that is, increase the density of the cells in each of the catalysts 106b and 107b; and 3) to raise the amount of the noble metal in the wash coat layer 114.

Thanks to the above attempts, the property of purifying exhaust gas by catalytic converter apparatuses has been enhanced. As a result, for example, in a test vehicle Y (see FIG. 3) equipped with an engine of 2.4 litter displacement, one catalyst has 900 cells/in$^2$ and the other has 600 cells/in$^2$. In addition, the vehicle contains noble metal of 12 g.

Moreover, Japanese Unexamined Patent Application Publication 2004-330025 discloses a catalyst provided with a wash coat layer having multiple voids. With these voids presented in the wash coat layer, exhaust gas is diffused widely and an area where the exhaust gas comes into contact with the catalyst is made large. This results in the improvement of the purification property.

However, when the density of the cells in a catalyst increases for the above reason, the exhaust gas resistance of the catalyst is prone to be high. This may cause the rise in the pressure of the exhaust gas, which lowers the output power of the engine. In addition, an amount of noble metal in a catalyst may increase, thus leading to high manufacturing costs for a vehicle.

Using of the catalyst disclosed by JP2004-330025 makes it possible to improve the purification property of catalytic converter apparatuses. However, this document fails to teach or suggest that the catalyst supports a small amount of noble metal, or that it is adapted to lower the exhaust gas pressure of the engine when being applied to an engine.

Taking the above description into account, the present invention has been conceived. An object of the present invention is to provide a catalytic converter apparatus for purifying exhaust gas from an engine, which achieves an improved purification property with a small amount of noble metal, and which is configured to decrease the resistance of exhaust gas.

SUMMARY OF THE INVENTION

According to an aspect of the present invention, there is provided, a catalytic converter apparatus includes a first catalytic converter that holds a first catalyst and that is to be coupled to a side of the engine, and a second catalytic converter that holds a second catalyst and that is coupled to a rear of the first catalytic converter. Each of the first and second catalysts has a catalytic support on which a wash coat layer having a thickness equal to or less than 0.2 mm is formed. The wash coat layer includes a first wash coat layer and a second wash coat layer, and each of the first and second wash coat layers has voids therein.

The above catalytic converter apparatus achieves an improved purification property with a small number of cells and a small amount of expensive noble metal. Furthermore, the catalytic converter apparatus is configured to decrease the resistance of exhaust gas.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein:

FIG. 5 is graphs and a table which all show a comparative result of a purifying properties in a G type exhaust structure;

FIG. 6 is graphs and a table which all show a comparative result of a purifying properties in an H type exhaust structure;

FIG. 8A is a perspective view depicting a catalyst supported by a catalytic converter apparatus; and FIG. 8B is an enlarged cress-section view of an internal structure of the catalyst.

DETAILED DESCRIPTION OF THE EXEMPLARY EMBODIMENTS OF THE INVENTION

A detailed description will be given below, a catalytic converter apparatus according to an embodiment of the present invention, with reference to accompanying drawings.

First, a structure of a catalytic converter apparatus of this embodiment will be described.

Figure 1:
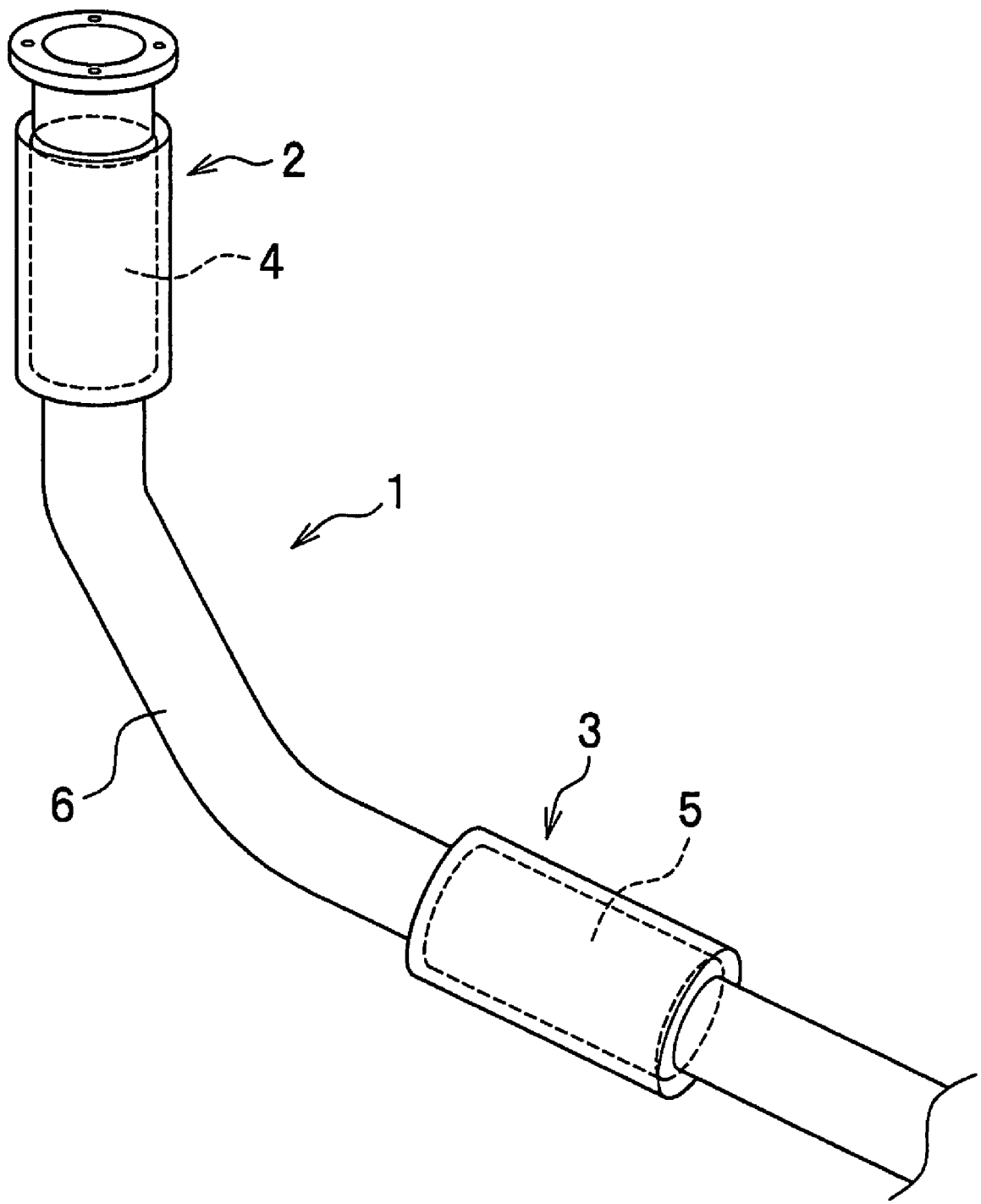
FIG. 1 is a perspective view depicting a catalytic converter apparatus according to an embodiment of the present invention.

FIG. 1 shows a catalytic converter apparatus 1 according to this embodiment which is adapted to purify exhaust gas from an engine. This apparatus includes a first catalytic converter 2, a second catalytic converter 3 and an exhaust pipe 6. This pipe couples the first and second catalytic converters 2 and 3. The catalytic converter apparatus 1 is to be coupled to a side of an engine where exhaust pipes are coupled, that is, where an exhaust manifold is positioned. The first catalytic converter 2 is to be placed relatively close to a main body of an engine where fuel burns. The second catalytic converter 3 is to be located under a floor of a vehicle. The first and second catalytic converters 2 and 3 include a catalyst 4 and a catalyst 5, respectively.

Figure 7:
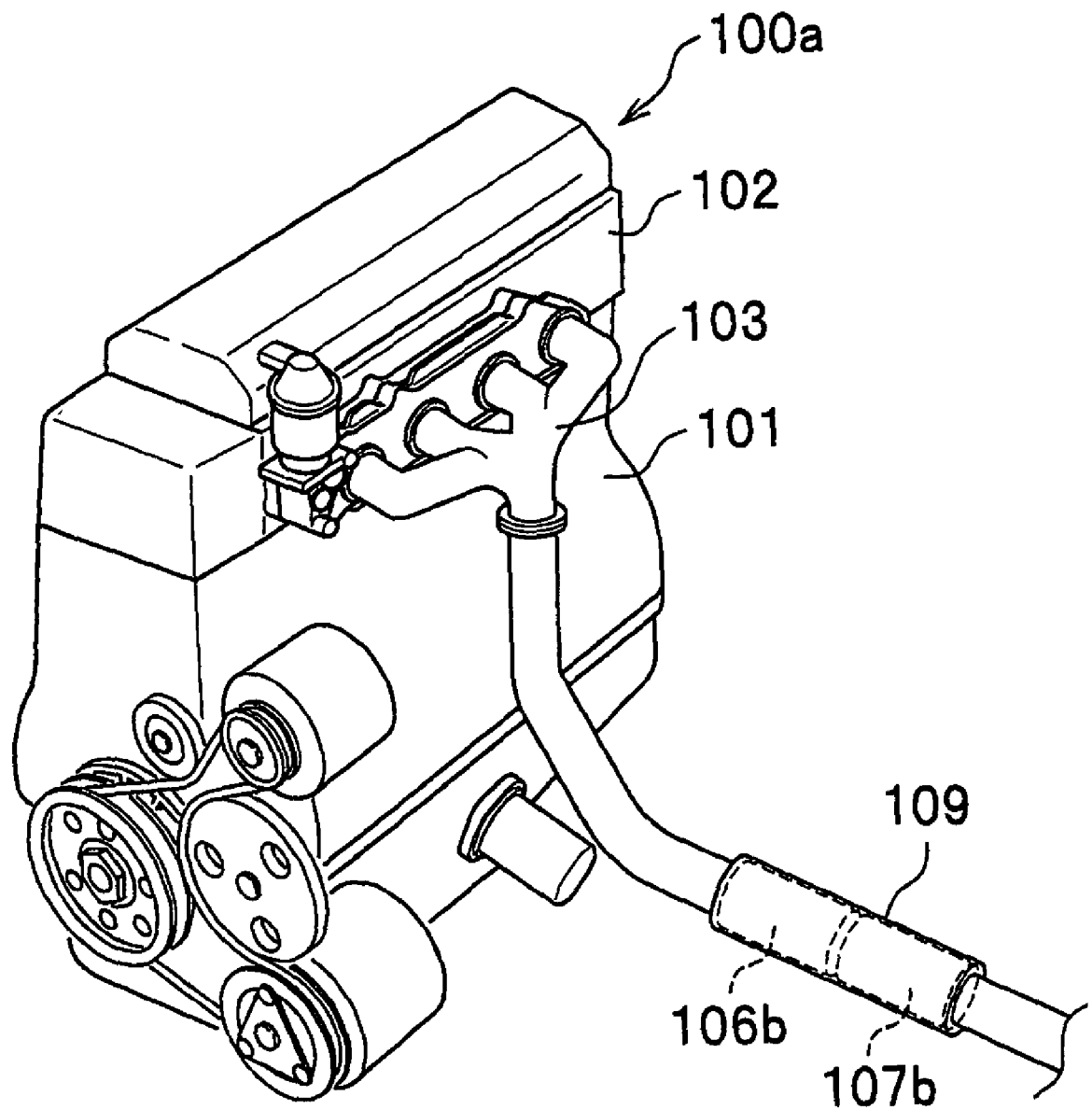
FIG. 7 is a perspective view depicting an engine's exhaust system in a test vehicle X.

The catalytic converter apparatus 1 differs from the catalytic converter 109 of a commercial vehicle X shown in FIG. 7, in that the two catalytic converters, that is, the first and second catalytic converters 2 and 3 are separated from each other. Although the catalytic converter 109 is to be placed under a floor of a vehicle, the first catalytic converter 2 of the catalytic converter apparatus 1 is to be located relatively close to a main body of an engine as described above. Therefore, in the catalytic converter apparatus 1, the distance between a main body of an engine and the first catalytic converter 2 on an exhaust pipe 6 is relatively short. Because of this physical property, the heat dissipation of the exhaust gas is reduced therebetween. Thus, exhaust gas having a high temperature is fed to the first catalytic converter 2. As a result, the catalyst 4 of the first catalytic converter 2 operates at a high temperature, thereby enabling the enhancement of the purification property.

The catalysts 106b and 107b of the catalytic converter 109 in the commercial vehicle X of FIG. 7 have 900 and 600 cells/in$^2$ respectively. However, the number of cells in each of the catalysts 4 and 5 of the catalytic converter apparatus 1 can be reduced. This results in the decrease in the exhaust gas pressure of the catalytic converter apparatus 1.

Due to the arrangement where the first catalytic converter 2 is positioned near a main body of an engine and an improvement of each catalyst as will be described later, the purification property of the catalytic converter apparatus 1 is enhanced. For this reason, the number of cells in each catalyst can decrease.

Each of the catalysts 4 and 5 has a honeycomb structure, similar to the exhaust gas catalyst 110 of FIG. 8.

Figure 2:
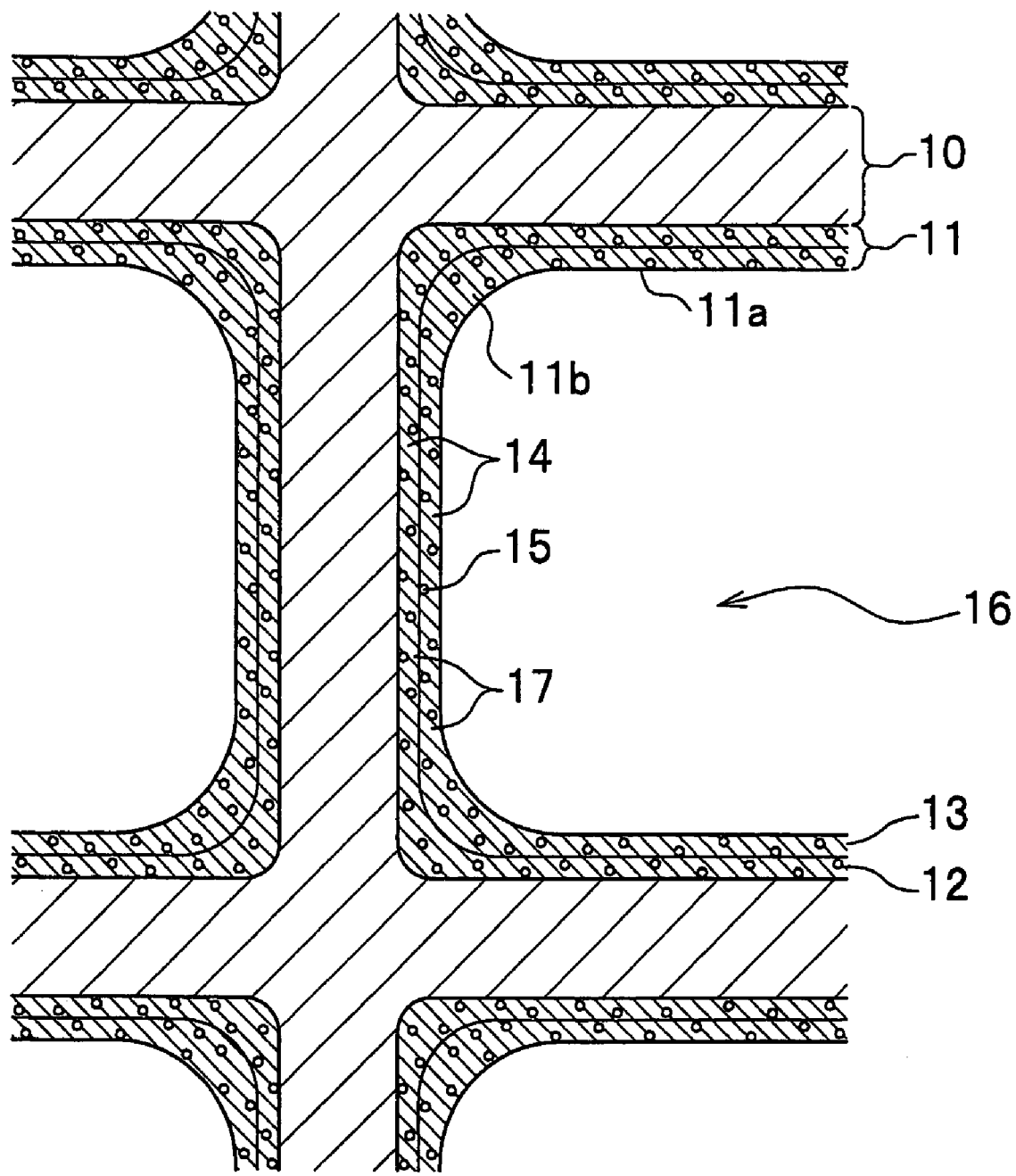
FIG. 2 is a cross-section view of a catalyst support and a wash coat layer formed thereon in a honeycomb structure of a catalyst that is supported by a catalytic converter in the catalytic converter apparatus.

FIG. 2 shows a structure of each of the catalysts 4 and 5 in the catalytic converter apparatus 1 of FIG. 1. A wash coat layer 11 in a cell 16 is formed on a catalyst support 10 forming the honeycomb structure of the catalyst. The wash coat layer 11 is composed of a wash coat layers 11a (line portion) and a wash coat layers 11b (corner portion). The wash coat layer 11b is thicker than the wash coat layer 11a. Specifically, the wash coat layer 11a is 0.06 mm in average thickness, while the wash coat layer 11b is 0.15 mm in average thickness and equal to/less than 0.2 mm in maximum thickness. This wash coat layer 11 is about 30% thinner than the wash coat layer of the catalyst 106b or 107b of FIG. 7.

The wash coat layer 11 of each of the catalysts 4 and 5 is composed of two layers; one is a first wash coat layer 12 formed on the catalyst support 10 and the other is a second wash coat layer 13 formed on the first wash coat layer 12 (see FIG. 2). Each of the first and second wash coat layers 12 and 13 is formed of a porous structure 14 of which main component includes aluminum oxide (alumina), zirconium oxide (zirconia), and ceric oxide (ceria). The porous structure 14 supports noble metal 17 made of at least one of Pt, Pd and Rh. This noble metal 17 serves as a catalyst.

The porous structure 14 has multiple voids 15, that is, air gaps in the layer. In contrast, the wash coat layer of the catalysts 106b and 107b of FIG. 7 has no voids.

Each void 15 is 0.004 mm±0.002 mm in diameter, and the voids 15 occupy about 20% of the whole volume of each of the first and second wash coat layers 12 and 13. However, the present invention is not limited to this configuration. Alternatively, the occupancy ratio of the voids 15 may range from 10% to 60%. The voids 15 facilitate the diffusing of the exhaust gas, so that the purification property of the catalysts 4 and 5 is enhanced. Thanks to the voids 15, the noble metal 17 are exposed to the cell 16 sufficiently. Hence, the ratio of the noble metal 17 which serves as a catalyst is made high, thus leading to the advancement of the purification property.

Sintered alumina in the porous structure 14 (see FIG. 2) is stable at high temperatures and has a large surface area. Therefore, the noble metal 17 is distributed widely in the porous structure 14. Consequently, a ratio at which the noble metal 17 serves as a catalyst in the wash coat layer 11 is relatively high.

Ceria in the porous structure 14 has the oxidation-reduction property, depending on the valence of ceria ions contained therein. If oxygen excessively resides in exhaust gas, then the ceria lowers the oxygen partial pressure by being coupled to the oxygen atoms in the excess oxygen. Meanwhile, if a small amount of oxygen is contained in exhaust gas, then the oxygen atoms coupled to ceria is liberated, thereby increasing the oxygen partial pressure in the exhaust gas. Such a property of ceria reduces the rapid change in the oxygen partial pressure of the exhaust gas, in the case where the catalytic converter apparatus 1 is applied to an engine that controls an air-fuel ratio based on stoichiometry (e.g. stoichiometry type engine). As a result, the oxygen partial pressure in the exhaust gas is kept at a certain level at which reducing hydrocarbon, nitric oxide and oxidizing nitrogen oxides are removed at the same time.

Zirconia in the porous structure 14 has a property of enhancing the thermal stability of ceria. Due to this property, the oxidation-reduction property of ceria is maintained, even if the porous structure 14 of the wash coat layer 11 is exposed to high temperatures for a long time.

The noble metal 17 on the first wash coat layer 12 in the catalyst 4 is the same as that of the first wash coat layer 12 in the catalyst 5. Specifically, barium (Ba) and palladium (Pd) are supported by the above porous structure 14. In this case, Ba acts to enhance the thermal stability of Pd, while preventing the rough enlargement of Pd particles.

On the other hand, the noble metal 17 of the second wash coat layer 12 in the catalyst 4 is different from that of the second wash coat layer 12 in the catalyst 5. The noble metal 17 in the second wash coat layer 13 of the catalyst 4 is Rh, while the noble metal 17 on the second wash coat layer 13 of the catalyst 5 is Pt and Rh.

As described above, the wash coat layer 11 of this embodiment is about 30% thinner than the wash coat layer of the commercial vehicle X of FIG. 7. Hence, the density of the noble metal 17 supported by the wash coat layer 11 in each of the catalyst 4 and 5 is higher than that in each of the catalysts 106b and 107b in the commercial vehicle X. Thus, the purification property of the catalysts 4 and 5 is superior to that of the catalysts 106b and 107b. Since the wash coat layer 11 is thin, the aperture in the each cell 16 occupies the large area of the cell 16. Thus, the exhaust gas resistance of each of the catalysts 4 and 5 is lower than that of the catalyst for a test vehicle Y of FIG. 3.

The wash coat layer 11 is fabricated by the following process. Material powder of the porous structure 14, component of the noble metal 17 and pyrolytic and flammable spherical molding body are dispersed into a solvent (e.g. water), thereby forming a slurry. Note that a material of the molding body includes foaming resin and activated charcoal. Next, a honeycomb base material made of cordierite, which is to make up the catalyst support 10, is dipped into the slurry. Following this, it is taken away therefrom and dried. Finally, the base material is sintered, thereby forming the first wash coat layer 12 on the catalyst support 10. The density of the slurry is adjusted such that the wash coat layer has a predetermined thickness. While being sintered, the molding body is decomposed, whereby the voids 15 are formed in the first wash coat layer 12. By repeating the above process, the second wash coat layer 13 having the voids 15 is also formed on the first wash coat layer 12. The catalyst fabricated by the above processes has a thermal resistance equal to/more than 800° C., because all materials thereof have high thermal resistance.

Next, a detailed description will be given below, of behavior and effect of the catalytic converter apparatus 1 according to this embodiment.

The purification property of the catalytic converter apparatus 1 was evaluated by amount of NMOG and NOx. In addition, the purification property was tested based on the following three parameters.

1) CT (mg/km):
Started up an engine of a vehicle;
Ran the vehicle over a predetermined distance while the engine was cool;
Measured an amount of residual harmful substance contained in exhaust gas from the engine; and
Corrected the measured amount by multiplying it by a predetermined constant, thereby determining CT. Note that the predetermined constant was determined according to a certain driving condition of "cool start" in the modeled driving for evaluating the exhaust system.

2) CS (mg/km):
Started up and warmed up an engine of a vehicle;
Ran the vehicle over a predetermined distance after the engine was completely warmed;
Measured an amount of residual harmful substance contained in exhaust gas from the engine; and
Corrected the measured amount by multiplying it by a predetermined constant, thereby determining CS. Note that the predetermined constant was determined according to a certain driving condition of "warm start" in the modeled driving for evaluating the exhaust system.

3) HT (mg/km):
Started up and warmed up an engine of a vehicle;
Stopped the engine after the engine was completely warmed;
Started up the engine again;
Ran the vehicle over a predetermined distance while the engine was warm;
Measured an amount of residual harmful substance contained in exhaust gas from the engine; and
Corrected the measured amount by multiplying it by a predetermined constant. Note that the predetermined constant was determined according to a certain driving condition of "warm re-start" in the modeled driving for evaluating the exhaust system.

The sum of these parameters "CT+CS+HT" was defined as a reference for determining an amount of harmful substance. By using this parameter, the purification properties of Examples and Comparative examples were determined. As the value "CT+CS+HT" was lower, the purification property was considered to be superior.

The purification property of the catalytic converter 109 in the commercial vehicle X of FIG. 7 was compared with that of the catalytic converter apparatus 1 of this embodiment by being applied to the same engine. This result revealed that "CT+CS+HT" of any of NMOG and NOx in the catalytic converter apparatus 1 was lower than that of the catalytic converter 109. Thus, the catalytic converter apparatus 1 was superior to the catalytic converter 109. This performance difference is considered to be ascribable to two factors: one is the structure of the catalytic converter, and the other is the physical property of the wash coat layer.

Next, a description will be given below, of an effect of the wash coat layer 11 of the catalyst 4 or 5.

Figure 3:
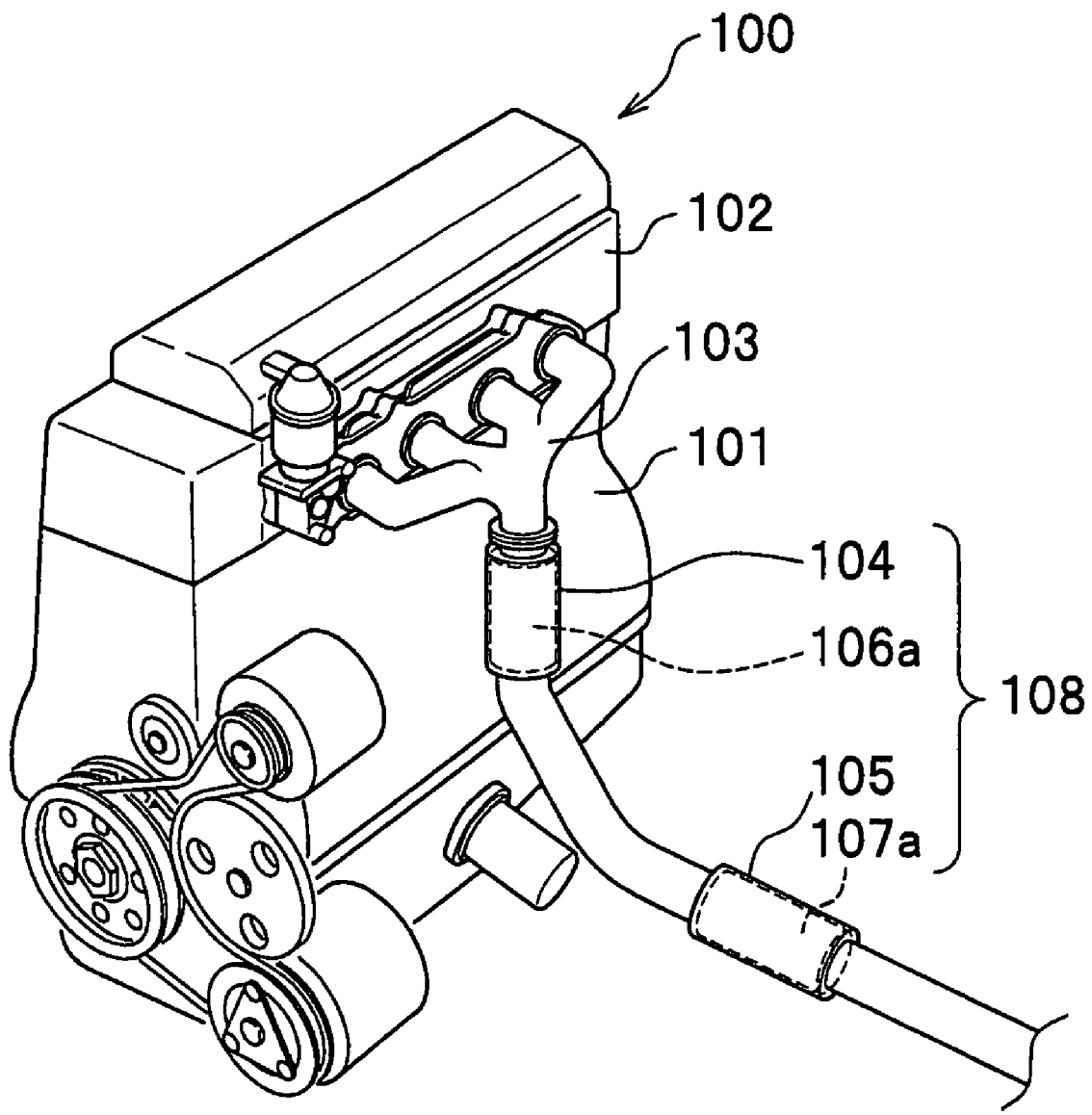
FIG. 3 is a perspective view depicting an engine's exhaust system in a test vehicle Y.

The purification property of the catalytic converter apparatus 1 was tested by using two engine's exhaust system. One of the systems is shown in FIG. 3 (G type of exhaust structure)

Referring to this figure, a G type of exhaust structure 100 operates as follow. Exhaust gas is discharged from cylinders of a cylinder block 101. Subsequently, the exhaust gas passes through an engine head block 102 and an exhaust manifold 103. Finally, the exhaust gas reaches the catalytic converter apparatus 108. The catalytic converter apparatus 108 is identical in structure to the catalytic converter apparatus 1 of this embodiment. Further, the apparatus 108 includes a first catalytic converter 104 holding a catalyst 106a, and a second catalytic converter 105 holding a catalyst 107a.

Figure 4:
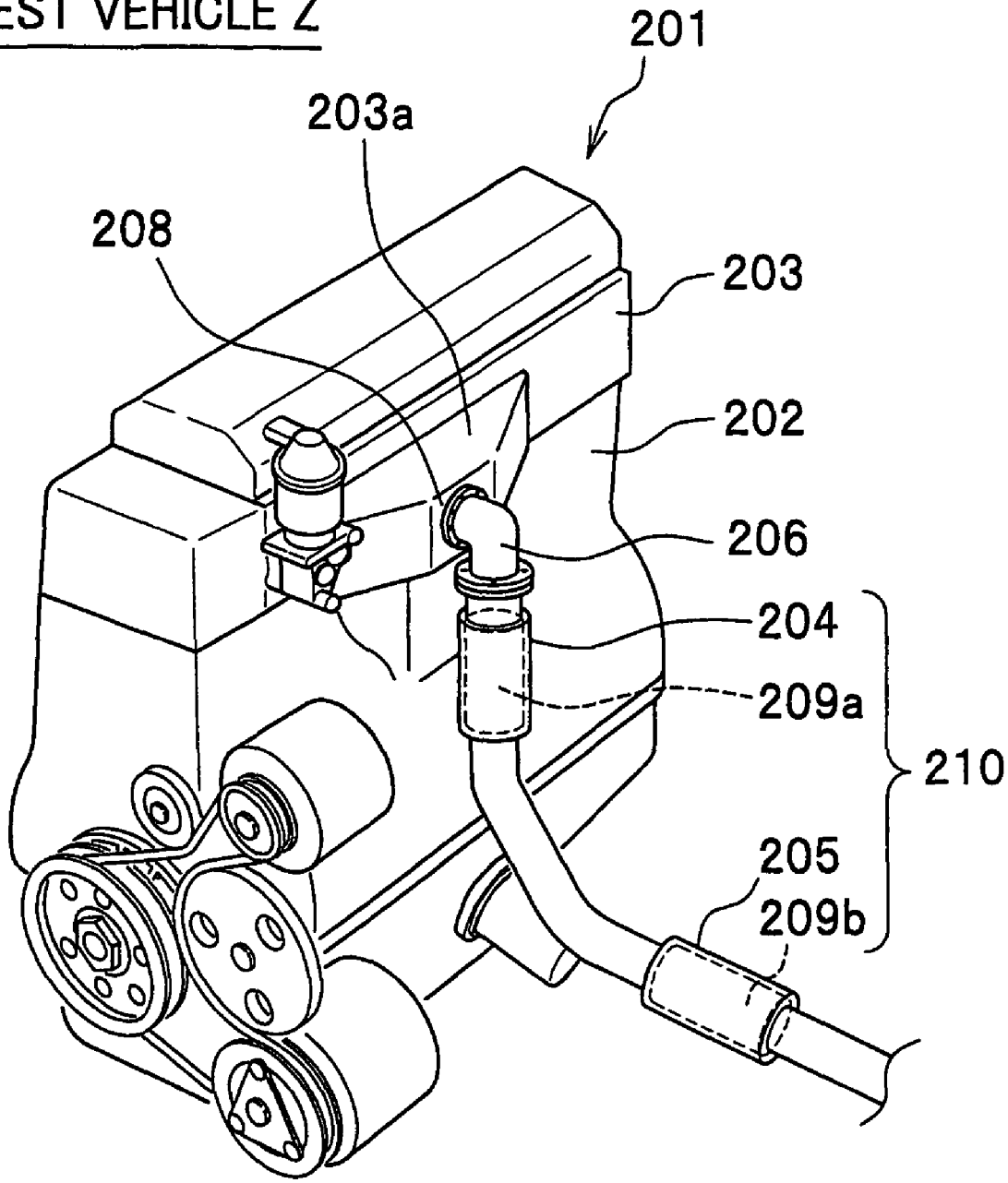
FIG. 4 is a perspective view depicting an engine's exhaust system in a test vehicle Z.

The other engine's exhaust system is shown in FIG. 4 (H type of exhaust structure).

Referring to this figure, the H type of exhaust structure in the test vehicle Z is an improved model of the G type of exhaust structure in the test vehicle Z. The G type of exhaust structure 201 operates as follows. Exhaust gas is discharged from cylinders of the cylinder block 202. The exhaust gas passes through an exhaust system forming a single gap in an engine head block 203. Subsequently, the exhaust gas passes through an exhaust pipe 206 coupled to an outlet 208 of an extruded portion 203a formed on the side of an engine head block 203. Finally, the exhaust gas reaches a catalytic converter apparatus 210. This catalytic converter apparatus 210 is identical in structure to the catalytic converter apparatus 1 of this embodiment. Further, the apparatus 210 has a first catalytic converter 204 holding a catalyst 209a, and a second catalytic converter 205 holding a catalyst 209b.

In the H type of exhaust structure, the engine head block 202 and the first catalytic converter 204 are coupled by an exhaust pipe 206. This pipe is shorter than that of the exhaust manifold 103 of the G type of exhaust structure shown in FIG. 3. Therefore, the heat dissipation between the cylinders and the catalytic converter apparatus 210 is low in comparison with the G type of exhaust structure. In other words, the temperature of catalyst 209a in the first catalytic converter 204 is higher than that of the G type of exhaust structure. Accordingly, the catalyst 209a in the H type of exhaust structure can serve more actively than that in the G type of exhaust structure. This means that the catalytic converter apparatus 210 exhibits an improved purification property.

Now, a description will be given, of an effect of the catalytic converter apparatus according to this embodiment, based on a test result obtained in the case where the apparatus is applied to the G type exhaust structure.

Referring to FIG. 5, let the catalytic converter apparatus of an Example of this embodiment be a catalytic converter apparatus C. Let a Comparative example 1 be a catalytic converter apparatus A that was equivalent to the catalytic converter apparatus 108 for the test vehicle Y of FIG. 3. The catalytic converter apparatus A was similar in structure to the catalytic converter apparatus C, in that it included the first catalytic converter 104 and the second catalytic converter 105. However, the catalysts 106a and 107a supported by the catalytic converter were similar to those of the commercial vehicle X of FIG. 7. Specifically, its wash coat layer was thicker than the wash coat layer 11 of this embodiment, and had no voids 15 (see FIG. 2). Let a Comparative example 2 be a catalytic converter apparatus B. The apparatus B was basically similar to the catalytic converter apparatus A, but their difference is that an amount of the noble metal in the apparatus B was less than that of the apparatus A.

Referring to FIG. 5, the catalytic converter apparatus C of the Example had half as many cells as the catalytic converter apparatus A of the Comparative example 1 did. In addition, the apparatus C supported one-third as much noble metal as the apparatus A did. However, residual amount of NMOG and NOx in the exhaust gas from the catalytic converter apparatus C were almost the same as those of the catalytic converter apparatus A.

Thus, this result proves that the catalytic converter apparatus C has almost the same purification property as the catalytic converter apparatus A does, with the noble metal being one-third as much as that in the apparatus A. In addition, the catalytic converter apparatus C successfully decreases the exhaust gas resistance.

According to the test result of the catalytic converter apparatus B with one-third of noble metal (see FIGS. 5(a) and 5(b)), the residual amount of NMOG and NOx in the exhaust gas were greater than those of the apparatus A. This indicates that the catalytic converter apparatus A is unable to decrease the amount of the noble metal in the catalyst without degrading the purification property. In contrast, the catalytic converter apparatus C successfully maintains the purification property with a small number of cells and a small amount of noble metal. This is due to the thin wash coat layer 11 and the voids of the wash coat layer 11.

Naturally, if the number of the cells and the amount of the noble metal in the catalytic converter apparatus C increase, then the catalytic converter apparatus C exhibits more excellent purification property than the catalytic converter apparatus A.

Next, a description will be given below, of an effect of the catalytic converter apparatus of the Example, based on a test result obtained in the case where the apparatus is applied to the H type exhaust structure.

In FIGS. 6(a) and 6(b), let the catalytic converter apparatus of an Example be a catalytic converter apparatus C. Let the Comparative example 1 be a catalytic converter apparatus A. A Comparative example 3 was a catalytic converter apparatus D, the cells of which was fewer than the catalytic converter apparatus A.

Referring to FIG. 6, the catalytic converter apparatus C of the Example had half as many cells as the catalytic converter apparatus A of the Comparative example 1 did. In addition, the apparatus C supported one-third as much noble metal as the apparatus A did. However, residual amount of NMOG and NOx in the exhaust gas from the catalytic converter apparatus C were almost the same as those of the catalytic converter apparatus A.

Thus, the result proves that the catalytic converter apparatus C has almost the same purification property as the catalytic converter apparatus A does, with the noble metal being one-third as much as the apparatus A. In addition, the catalytic converter apparatus C successfully decreases the exhaust resistance.

Considering the result of the catalytic converter apparatus D of the comparative example 3 (see FIGS. 6(a) and 6b)), it is clear that the residual amount of NMOG and NOx in the exhaust gas increased. Thus, it is impossible to decrease the amount of the noble metal in the catalyst without degrading the purification property. In contrast, the catalytic converter apparatus C successfully maintains the purification property with a small number of cells and a small amount of noble metal. This is attributed to the thin wash coat layer 11 and the voids of the wash coat layer 11.

Referring to FIGS. 5 and 6, the catalytic converter apparatus C of the Examples demonstrated the more excellent purification property when being applied to the H type of exhaust structure than being applied to the G type. This is because the first catalytic converter 204 in the H type of exhaust structure operated at a higher temperature than that in the G type did, as described above.

Needless to say, if the number of the cells and the amount of the noble metal increases in the catalytic converter apparatus C, then it exhibits more excellent purification property than that of the catalytic converter apparatus A.

Considering the result of the tests using the G and H types of exhaust structures, the catalytic converter apparatus C of this embodiment had low exhaust gas pressure and supported a small amount of noble metal in comparison with the catalytic converter apparatus A applied to the test vehicle Y. However, the purifying properties of the catalytic converter apparatuses C and A were almost the same. This attributes to the wash coat layer 11 of the catalytic converter apparatus C.

Generally, the purification property of catalytic converter apparatuses has been improved by increasing the number of cells in a catalyst or an amount of noble metal. However, with the catalytic converter apparatus C of the Example according to this embodiment, its purification property can be improved without increasing any of them.

In conclusion, the catalytic converter apparatus 1 makes it possible to present the improved purification property, to decrease the exhaust gas pressure of an engine, to increase the output of the engine, and to reduce overall costs for a vehicle.

In the Example, the number of the cells per square inches in the first and second catalytic converters was 400 and 350, respectively. Moreover, the amount of the noble metal in the catalytic converter apparatus was 4 g. However, the present invention is not limited to this configuration. It is obvious that the number of the cells or the amount of the noble metal in the catalytic converter apparatus can be varied without departing from the spirit and scope of the claims.

What is claimed is:

1. A catalytic converter apparatus coupled with an engine head block in an internal combustion engine for vehicles for purifying exhaust gas exhausted from the engine head block, comprising:

a first catalytic converter holding a first catalyst; and a second catalytic converter coupled with the engine head block through the first catalytic converter, the second catalytic converter holding a second catalyst;

each of the first and second catalysts having a catalytic support on which a wash coat layer having a thickness equal to or less than 0.2 mm is formed;

the wash coat layer including a first wash coat layer on the catalytic support and a second wash coat layer on the first wash coat layer, each of the first and second wash coat layers comprising a porous material made substantially of aluminum oxide, zirconium oxide and ceric oxide, and having a plurality of voids therein; and each of the plurality of voids being 0.004 mm±0.002 mm in diameter;

wherein the plurality of voids occupy 10% to 60% of a whole volume of each of the first and second wash coat layers;

the first catalyst has Ba and Pd supported on the porous material in the first wash coat layer, and Rh supported on the porous material in the second wash coat layer, and the second catalyst has Ba and Pd supported on the porous material in the first wash coat layer and Rh and Pt supported on the porous material in the second wash coat layer.

2. The catalytic converter apparatus according to claim 1, wherein the catalytic converter apparatus has a thermal resistance equal to or higher than 800° C.

* * * * *